United States Patent
Borhan

(10) Patent No.: US 11,022,981 B2
(45) Date of Patent: Jun. 1, 2021

(54) CONTROL ARCHITECTURE FOR PREDICTIVE AND OPTIMAL VEHICLE OPERATIONS IN A SINGLE VEHICLE ENVIRONMENT

(71) Applicant: Cummins Inc., Columbus, IN (US)

(72) Inventor: Hoseinali Borhan, Bloomington, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 16/176,947

(22) Filed: Oct. 31, 2018

(65) Prior Publication Data

US 2019/0129440 A1 May 2, 2019

Related U.S. Application Data

(60) Provisional application No. 62/579,446, filed on Oct. 31, 2017.

(51) Int. Cl.
| | | |
|---|---|---|
| *G05D 1/02* | (2020.01) | |
| *G05D 1/00* | (2006.01) | |
| *B60W 30/14* | (2006.01) | |
| *G08G 1/00* | (2006.01) | |

(52) U.S. Cl.
CPC ........ *G05D 1/0223* (2013.01); *B60W 30/143* (2013.01); *G05D 1/0027* (2013.01); *G05D 1/0088* (2013.01); *G05D 1/0221* (2013.01); *G08G 1/22* (2013.01); *B60W 2552/00* (2020.02); *B60W 2555/20* (2020.02); *B60W 2555/60* (2020.02)

(58) Field of Classification Search
None
See application file for complete search history.

(56) References Cited

U.S. PATENT DOCUMENTS

| | | | |
|---|---|---|---|
| 6,024,667 A | * | 2/2000 | Krohm ............... B60K 6/105 |
| | | | 477/6 |
| 8,095,290 B2 | | 1/2012 | Smyth et al. |
| 8,620,569 B2 | | 12/2013 | Taguchi |
| 8,676,466 B2 | | 3/2014 | Mudalige |
| 8,744,666 B2 | | 6/2014 | Switkes et al. |
| 8,831,813 B1 | | 9/2014 | Ferguson et al. |

(Continued)

FOREIGN PATENT DOCUMENTS

| | | |
|---|---|---|
| WO | 2017065754 | 4/2017 |
| WO | 2017137566 | 8/2017 |
| WO | 2017210200 | 12/2017 |

OTHER PUBLICATIONS

Li, Shengbo, et al., Model Predictive Multi-Objective Vehicular Adapative Cruise Control, IEEE Transaction of Control Systems Technology, vol. 19, No. 3, pp. 556-566, May 2011.

(Continued)

*Primary Examiner* — Kaveh Abrishamkar
(74) *Attorney, Agent, or Firm* — Taft Stettinius & Hollister LLP

(57) ABSTRACT

There is disclosed a cloud computing control system for vehicle speed control and also for control of a vehicle in a platoon. The cloud computing control system determines a speed trajectory and neutral coasting command for a first vehicle of the platoon and a vehicle controller determines a reference speed for the first vehicle in response to the speed trajectory and the neutral coasting command, and is response to one or more vehicle specific factors associated with the first vehicle.

10 Claims, 3 Drawing Sheets

(56) References Cited

U.S. PATENT DOCUMENTS

| | | | |
|---|---|---|---|
| 8,930,115 B2 | 1/2015 | Filev et al. | |
| 8,930,116 B2 | 1/2015 | Filev et al. | |
| 8,948,995 B2 | 2/2015 | Pandita et al. | |
| 9,002,612 B2 | 4/2015 | McNew | |
| 9,182,764 B1 | 11/2015 | Kolhouse et al. | |
| 9,224,300 B2 | 12/2015 | Lee et al. | |
| 9,349,285 B1* | 5/2016 | Fowe | G08G 1/00 |
| 9,551,993 B2 | 1/2017 | Kolhouse et al. | |
| 9,645,579 B2 | 5/2017 | Switkes et al. | |
| 10,017,039 B1* | 7/2018 | Colavincenzo | B60W 20/00 |
| 10,281,927 B2* | 5/2019 | Switkes | G08G 1/22 |
| 10,520,952 B1* | 12/2019 | Luckevich | G05D 1/0285 |
| 2007/0233326 A1 | 10/2007 | Jayachandran | |
| 2017/0011633 A1 | 1/2017 | Boegel | |
| 2017/0227972 A1* | 8/2017 | Sabau | G08G 1/22 |
| 2017/0270785 A1* | 9/2017 | Umehara | G08G 1/08 |
| 2017/0293296 A1* | 10/2017 | Stenneth | G01C 21/3438 |
| 2017/0343369 A1* | 11/2017 | Anastassov | G01C 21/3492 |
| 2017/0343370 A1* | 11/2017 | Giurgiu | G08G 1/0133 |
| 2017/0349176 A1 | 12/2017 | Alden et al. | |
| 2018/0082591 A1* | 3/2018 | Pandy | B60W 10/04 |

OTHER PUBLICATIONS

Stander, Thomas, et al., A Model Predictive Cooperative Adaptive Cruise Control Approach, 2013 American Control Conference (ACC) Washington, DE, pp. 1374-1379. Jun. 17-19, 2013.

Lang, Dominik, et al., Opportunities on Fuel Economy Utilizing V2V Based Drive Systems, SAE International, pp. 1-7, Apr. 8, 2013.

Turri, Valerio, Fuel-efficient and safe heavy-duty vehicle platooning through look-ahead control, Licentiate Thesis, Stockholm, Sweden, pp. 1-110, Oct. 2015.

Kaku, Anan, et al., Model Predictive Control for Ecological Vehicle Synchronized Driving, SICE Journal of Control, Measurements, and System Integration, vol. 6, No. 5, pp. 299-308, Sep. 2013.

Alam, Assad, et al., Heavy-Duty Vehicle Platooning for Sustainable Freight Transportation, IEEE Control Systems Magazine, pp. 34-56, Dec. 2015.

Turri, Valerio, et al., Fuel-efficient heavy-duty vehicle platooning by look-ahead control, IEEE Conference on Decision and Control, Los Angeles, California, pp. 654-660, Dec. 15-17, 2014.

Alam, Assad, et al., Look-Ahead Cruise Control for Heavy Duty Vehicle Platooning, Proceedings of the 16th International IEEE Annual Conference on Intelligent Transportation Systems, The Hague, The Netherlands, pp. 923-935, Oct. 6-9, 2013.

Lammert, Michael P., et al., Effect of Platooning on Fuel Consumption of Class 8 Vehicles Over a Range of Speeds, Following Distances, and Mass, SAE International, vol. 7, Issue 2, pp. 1-14, Oct. 2014.

Next Generation Energy Technologies for Connected and Automated On-Road Vehicles (NEXTCAR), Advanced Research Projects Agency—U.S. Department of Energy, pp. 1-98, Apr. 12, 2016.

Jeber, Mandus, Fuels Efficient Control of Vehicle Platoons Using Road Topography Information, Master's Thesis in Systems, Control, and Mechatronics, Gothenburg, Sweden, pp. 1-57, Jun. 2015.

* cited by examiner

CONTROL ARCHITECTURE FOR PREDICTIVE AND OPTIMAL VEHICLE OPERATIONS IN A SINGLE VEHICLE ENVIRONMENT

CROSS-REFERENCE TO RELATED APPLICATION

This application claims the benefit of the filing date of U.S. Provisional Application Ser. No. 62/579,446 filed on Oct. 31, 2017, which is incorporated herein by reference.

GOVERNMENT RIGHTS

This invention was made with Government support under DE-AR0000793 awarded by DOE, Office of ARPA-E. The Government has certain rights in this invention.

TECHNICAL FIELD

The present invention generally relates to a vehicle control architecture, and more particularly, but not exclusively, to a control architecture for predictive and optimal vehicle operations in a single vehicle or vehicle platooning environment.

BACKGROUND

Operating vehicles autonomously and/or in a platoon arrangement remains an area of interest. Some existing systems have various shortcomings relative to certain applications. Accordingly, there remains a need for further contributions in this area of technology.

SUMMARY

Embodiments of the present application include methods, systems and apparatuses for controlling autonomous vehicles. Embodiments of the present application also include methods, systems and apparatuses for controlling platooning of vehicles. Other embodiments include apparatuses, systems, devices, hardware, methods, and combinations for autonomous control and platooning vehicles. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
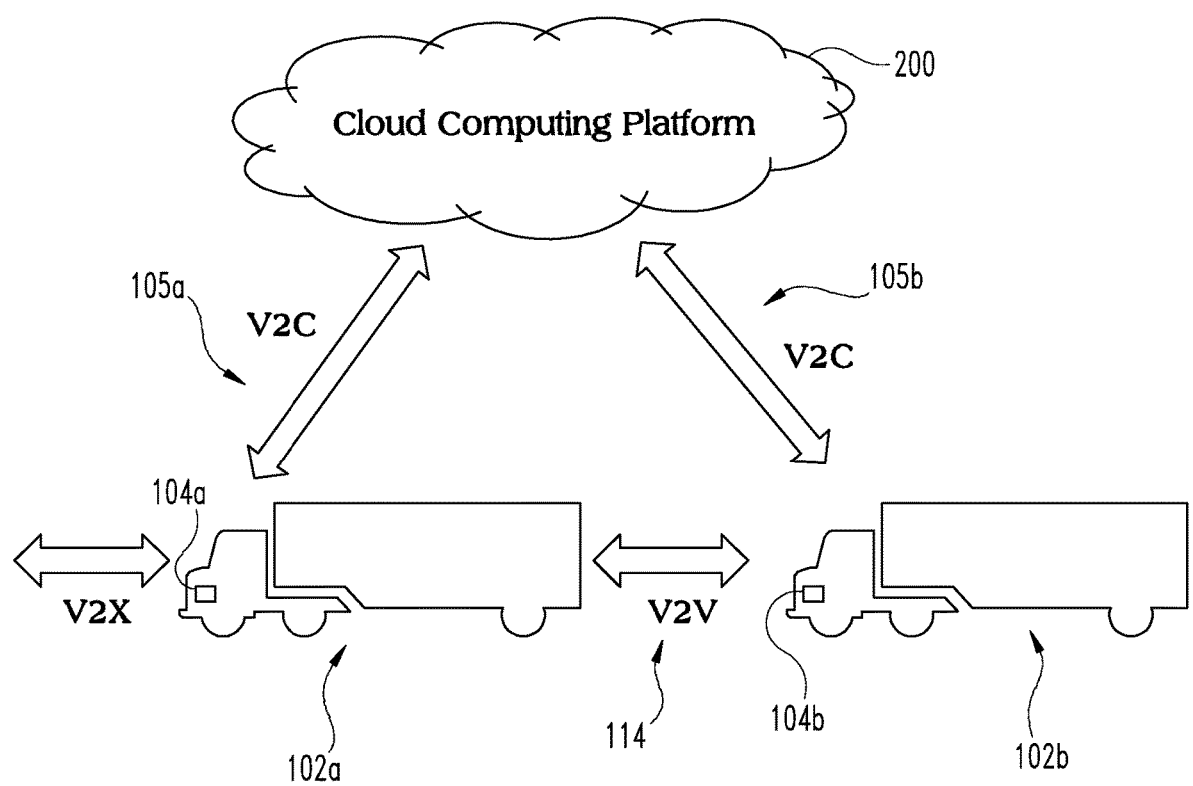
FIG. 1 depicts an embodiment of vehicles connected with a cloud computing control system.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, there is illustrated a schematic view of an example vehicle system 100 with a number of vehicles 102a, 102b each including a powertrain, such as an internal combustion engine, an electric motor, or a combination thereof (such as a hybrid vehicle), structured to generate power for the respective vehicle 102a, 102b of the vehicle system 100. The vehicles of the vehicle system 100 can sometimes be referred to as a truck, a tractor-trailer semi, etc. but no limitation is hereby intended to limit the vehicle system 100 to a truck, or tractor-trailer semi, etc. The vehicles can be operated autonomously without a driver, or with a driver and driver assist technology. Thus, the term vehicle system 100 or other vehicle designation is intended to cover a wide range of vehicles such as trucks, semis, tractor-trailers, box trucks, dump trucks, busses, passenger cars, etc. The vehicle system 100 illustrated in FIG. 1 includes vehicles that are depicted as tractor trailers, but any type of vehicle is thus contemplated herein. Several vehicles can operate in a vehicle system 100 independently and/or in a platooning operation in which the vehicles act together to reduce overall fuel costs and improve operation. Although only two vehicles 102a, 102b for vehicle system 100 are illustrated, any number of vehicles can be used.

Platooning vehicles can be described as a state where a series of vehicles such as vehicles 102a, 102b are linked together by telematics or GPS where the units or engines communicate to traverse along a route in a line as an operational cost efficient strategy. In certain embodiments, the lead vehicle 102a may be equipped with aerodynamic capability (wind assist panels on cab & trailer, aerodynamic tractor body) that creates a laminar flow of air (tunnel or slipstream effect) that greatly reduces air drag. The following vehicles 102b, etc. are spaced close enough to the lead vehicle 102a taking advantage of the "tunnel" or "slip stream" increasing fuel economy. The vehicles may be autonomous vehicles without a driver, or include a driver with an advanced driver assist system that directs or provides information to the driver to maneuver the vehicle in the vehicle system 100.

Each vehicle 102a, 102b in the vehicle system 100 can include a vehicle controller 104a, 104b, respectively, that is used to regulate various aspects of the vehicle operation and/or a platooning arrangement as discussed further herein. The vehicle controllers 104a, 104b can each be a single device or alternatively composed of a number of separate devices acting in concert. The vehicle controller 104a, 104b can be comprised of digital circuitry, analog circuitry, or a hybrid combination of both of these types. Also, the vehicle controllers 104a, 104b can be programmable, an integrated state machine, or a hybrid combination thereof. The vehicle controllers 104a, 104b can include one or more Arithmetic Logic Units (ALUs), Central Processing Units (CPUs), memories, limiters, conditioners, filters, format converters, or the like which are not shown to preserve clarity. In one form, the vehicle controllers 104a, 104b are of a programmable variety that executes algorithms and processes data in accordance with operating logic that is defined by programming instructions (such as software or firmware). Alternatively or additionally, operating logic for the vehicle controllers 104a, 104b can be at least partially defined by hardwired logic or other hardware.

Figure 2:
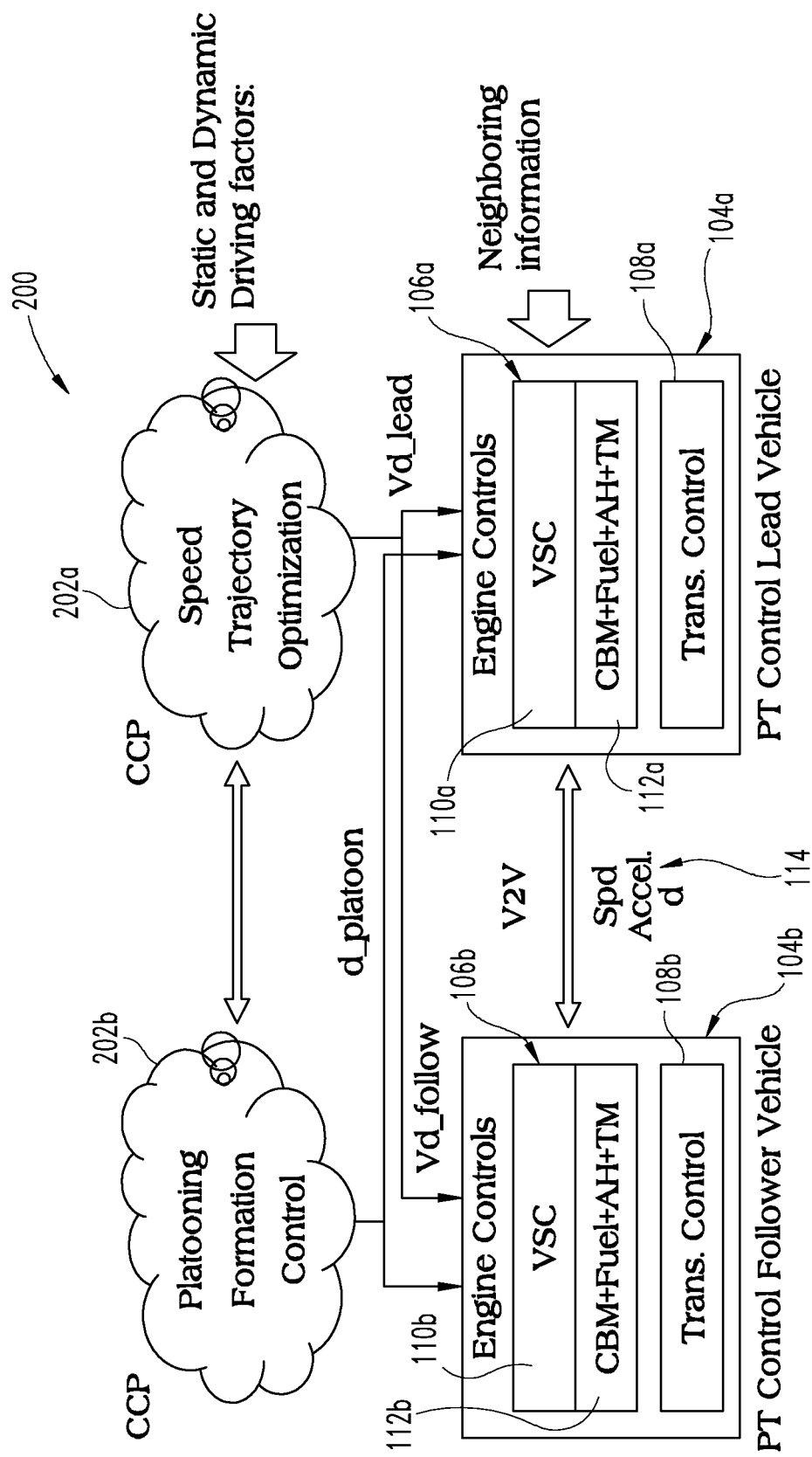
FIG. 2 depicts an embodiment of a control system useful to operate autonomous vehicle(s) and/or vehicles in a platoon system.

As shown in FIG. 2, vehicles 102a, 102b are arranged in a platoon system the speed of the lead vehicle 102a is controlled via vehicle controller 104a to a desired speed and the speed of the trail vehicle 102b is controlled by vehicle controller 104b to maintain a desired spacing behind the lead vehicle 102a. An exemplary cloud computing control system 200 can be provided that is useful to control various aspects of vehicle system 100, a speed trajectory of the vehicle 102a and the platooning techniques disclosed herein of the vehicles 102a, 102b arranged in a platoon. Cloud computing control system 200 can also be configured to communicate with two or more vehicle systems 100. Cloud computing control system 200 can also be configured to communicate with one or more autonomous vehicles 102a, 102b (e.g. a vehicle operating outside of a platoon) or vehicles operating in a platoon.

In one form the cloud computing control system 200 includes one or more cloud computing platforms 202a, 202b that communicate with one another and with each vehicle 102a, 102b in vehicle system 100 and/or across multiple vehicle systems 100. In some forms the cloud computing control system 200 will be understood to be the collective control functionality of one or more of the vehicles 102a, 102b and/or the vehicle system(s) 100 cooperating in a platoon using the techniques described below.

The cloud computing control system 200 may comprise a wireless communication system allowing a person, device or system remote from the vehicles of the vehicle system 100 to input information such as the driving factors discussed further below to the cloud computing control system 200. The cloud computing control system 200 can communicate with one or both of the vehicle controllers 104a, 104b over a wireless connection 105a, 105b, such as a Wi-Fi connection or a cellular connection. However, any suitable connection is contemplated.

The vehicle controller 104a, 104b can include one or more of the following (depending on the capabilities of any given vehicle system 100) for controlling the powertrain (PT) of the vehicle 102a, 102b: an engine (or powertrain) control module (ECM) 106a, 106b and a transmission control module 108a, 108b. The engine or powertrain control module 106a, 106b can include, for example, a vehicle speed controller 110a, 110b and operating lever controller 112a, 112b. The operating lever controller 112a, 112b can control combustion management, fuel, air handling and thermal management operating levers that may be appropriate for the respective vehicle 102a, 102b.

The vehicle controllers 104a, 104b may also include additional or alternate controllers including, for example, aftertreatment system controllers and vehicle system controllers, among others. The vehicle controllers 104a, 104b may be structured to control a number of aspects of the operation of the engine and other associated elements of respective vehicle 102a, 102b including, for example, air handling, provision of a first fuel type and exhaust aftertreatment, among other aspects.

The vehicle controllers 104a, 104b can also communicate vehicle-to-vehicle (V2V) and/or vehicle-to-X (V2X) to provide vehicle specific data. For example, a V2x communication system or V2V communication system 114 can communicate vehicle speed, vehicle acceleration, proximity or spacing distance d between vehicles 102a, 102b, and other vehicle specific information, between vehicle controllers 104a, 104b. Lead vehicle controller 104a can also receive inputs regarding the neighboring information that include vehicle specific factors for the lead vehicle 102a (or other corresponding vehicle of the platoon), such as a speed of a preceding vehicle, grade, other vehicle proximity, lane data, gear status, etc.

Cloud computing platform 202a, 202b is configured to determine a speed trajectory optimization and a neutral coasting command for vehicle 102a. The speed trajectory optimization is an optimal or desired speed for the respective vehicle 102a to accomplish the vehicle mission. The neutral coasting command is a disengagement of the engine or other prime mover from the transmission of the vehicle for coasting of the vehicle 102a for energy savings and increased efficiency. Cloud computing platform 202a, 202b receives various inputs to determine the optimal speed trajectory $V_{d\_lead}$ and neutral coasting commands as a function of position of the vehicle 102a. The inputs can include, for example, various driving factors. The driving factors can include, for example, static driving factors such as road or route grade, speed limits, stop sign locations, etc. The driving factors can also include dynamic driving factors, such traffic conditions (flow and/or density), speed limits, wind conditions, weather conditions, traffic signal conditions, etc.

The driving factors input to cloud computing platform 202a, 202b may also include information relating to the existence and/or duration of extended idle conditions for the platoon, mission performance parameters (e.g., mission route, mission length, length or duration of certain mission activities, platooning or convoying opportunities, route planning, and weather or traffic planning), requirements for shore power (e.g., auxiliary power unit (APU) devices such as no-idle climate control systems or other power take off (PTO) devices), among other information. The driving factors may also include information related to, for example, fuel cost, diesel exhaust fluid (DEF) cost, fuel and/or DEF availability, fuel and/or DEF supply or purchase agreements, sociability constraints, peak performance requests, and on/off-road use, among others. The driving factors input to cloud computing platform 202a, 202b may also include information related to fleet-specified factors including, for example, emissions banking and credit trading, load management, and customer or fleet operator preferences.

Based on one or more of these static or dynamic driving factors and desired vehicle distance and speed from platooning formation control server 202b, the speed trajectory optimization module determines the optimal speed trajectory $V_{d\_lead}$ and neutral coasting command for the lead vehicle 102a. The optimal speed trajectories can be determined independently of any platoon formation. The reference speed and neutral coasting command are provided as an output to control the speed of the lead vehicle 102a and also as an input to trailing vehicle controller 104b.

Cloud computing platform 202b receives inputs from cloud computing platform 202a and is configured to output lead vehicle control information to lead and/or trailing vehicle controllers 104a, 104b. The platooning formation control information can include, for example, a distance d for spacing between the lead vehicle 102a and a trailing vehicle 102b, a distance between two trailing vehicles, a selection of a vehicle in the platoon for re-positioning as the lead vehicle, and a change of order of vehicles in the platoon.

The platooning formation control information from cloud computing platform 202a, 202b can also include an order of vehicles in the platoon. Using knowledge of locations, velocities, destinations and available hours of each of the vehicles 102a, 102b in a platoon, a specific vehicle 102a, 102b can be directed to platoon behind another and then, once in formation, use information of the V2V communication system 114 to ensure appropriate following of a lead or preceding vehicle. Other information could also be used such as, but not limited to, inter-vehicle distance.

Designations about which position the respective vehicles will have within a platoon can be negotiated from vehicle to vehicle, or can be determined remotely and communicated to the vehicles. For example, cloud computing control system 200 could receive and coordinate platoon requests/invitations and then issue commands (such as through an intelligent transport system (ITS)) regarding which position the various vehicles should take.

In another additional and/or alternative embodiment, the size/length/arrangement of platooning vehicles can be actively managed by cloud computing control system 200 depending on circumstances as they occur during travel of the platoon. The platoons can be split up or broken into one or more smaller units. Such a breakup might still result in the vehicles operating as a loose platoon (e.g. with rather larger inter-vehicle distances separating each vehicle) until such time that the platoon can be reformed. Other breakups may result in a designation of operation in which one or more vehicles is not included in the platoon and can float to whatever distance is best suited for the vehicle, until such time that the platoon can be re-engaged. The number of vehicles in the platoon might be limited based on the influence of combination of factors. A platoon has a minimum length of two vehicles. The maximum length may depend on one or more of the following: type of trailers in the platoon, state regulations (which may be detectable via GPS and database/table provided in cloud computing control system 200), operating environment (urban/rural, type of road—# lanes), determination if there is a fuel consumption benefit to the truck, road conditions (construction, weather), type of cargo (hazmat, flammables) and, if used on secondary roads (railroad crossings, traffic signals), among potential others.

The vehicle controllers 104a, 104b can include or be connected to, for example, a vehicle input (VI) system, a human-machine interface (HMI) system, a GPS system, V2X and/or V2V communication system 114, and a vehicle proximity sensor (VPS) system.

A VI system can provide information pertaining to vehicle control commands to the respective vehicle controller 104a, 104b. The provided information may include brake pedal position information, accelerator pedal position information, cruise control setting information, and other information provided by one or more vehicle control devices or systems. The vehicle controller 104a, 104b may process the received information to determine additional information including, for example, brake pedal position rate of change information, brake pedal actuation frequency information, accelerator pedal position rate of change information, and accelerator pedal actuation frequency information. In certain embodiments cloud computing control system 200 processes the received information and such additional information may be determined by cloud computing control system 200 prior to being provided to the vehicle controller 104a, 104b.

The vehicle controller 104a, 104b may utilize the information received from cloud computing control system 200 and/or one or more other vehicles in determining commands for controlling various operational aspects of vehicle system 100, for example, engine control commands, fueling control commands, transmission shift commands, and brake actuation commands, among others.

A GPS system can provide information pertaining to vehicle location to cloud computing system 200 and/or vehicle controller 104a, 104b. The vehicle location information may be received by a receiver of cloud computing system 200 and/or vehicle controller 104a, 104b as a wireless signal from a satellite-based global positioning system.

The V2V system 114 provides information received from one or more of the vehicles 102a, 102b to one or more of the other vehicles 102a, 102b. The information may be received by a receiver or transceiver of V2V system 114 as a wireless communication signal from a variety of different sources equipped with a wireless transmitter or transceiver including, for example, other vehicles, traffic lights and other traffic signals, utility grid devices or systems, stationary transceivers in communication with other communication networks and remote servers or human-staffed computing systems also in communication with the other communication networks. The provided information may include information related to road or traffic signal conditions, information related to speed, acceleration and spacing between vehicles.

Cloud computing control system 200 and V2V system 114 may be utilized in connection with an ITS which comprises systems that integrate information and communication technologies with transportation infrastructure to improve economic performance, safety, mobility and environmental sustainability. An exemplary ITS may include three operational layers: a data collection layer, a data aggregation and translation layer and an information dissemination layer. The data collection layer may include one or more elements of clouding computing control system 200 as well as devices and systems on a plurality of vehicles which sense and transmit data associated a plurality of vehicles at particular geographical locations. The data collection layer may further include sensors, cameras and other data sources which are fixed relative to a roadway, or information from sensors, cameras and other data sources which are provided on surveillance vehicles such as planes and helicopters.

The data aggregation and translation layer comprises one or more computer based systems which receive and aggregate data from the data collection layer devices and process the received data to provide information about one or more roadway or traffic conditions. In certain aspects, the received data may include information about road grade, vehicle rate of speed, or change in rate of speed at particular locations which may be aggregated and processed to determine traffic speed over a given segment of roadway. In other aspects, information about weather conditions such as wind speed, precipitation and road conditions may be derived.

The information dissemination layer may include one or more elements of cloud computing control system 200 as well as devices and systems on a plurality of vehicles which receive information transmitted from the data aggregation and translation layer. The received information may include road grade information, information about traffic speed over a given segment of roadway, as well as information about weather conditions such as wind speed, precipitation and road conditions may be derived. ITS information from one or more of the foregoing layers may be received by one or all of the vehicles in the vehicle system 100 and provided to the respective vehicle controllers 104a, 104b.

A proximity sensor system may provide information pertaining to other vehicles or objects within a sensor range to the corresponding vehicle. The provided information may include distance to one or more vehicles 102a, 102b or objects in sensor range, velocity of one or more vehicles 102a, 102b or objects in sensor range, and acceleration of one or more vehicles 102a, 102b or objects in sensor range. One or more of the aforementioned systems and/or other useful systems, can be used to exchange information between the vehicles 102a, 102b participating in the platoon and the cloud computing control system 200.

One or more of the aforementioned circumstances can give rise to management of platoon configuration via cloud computing control system 200. These circumstances can be detected by one or more of the onboard systems described herein, and can also be communicated via ITS. Once the circumstance is detected by the platoon management system, active control of the platoon configuration can commence. Commands or requests can be generated to separate the platoon into larger inter-vehicle distances and possibly break the platoon until a possible later engagement.

Figure 3:
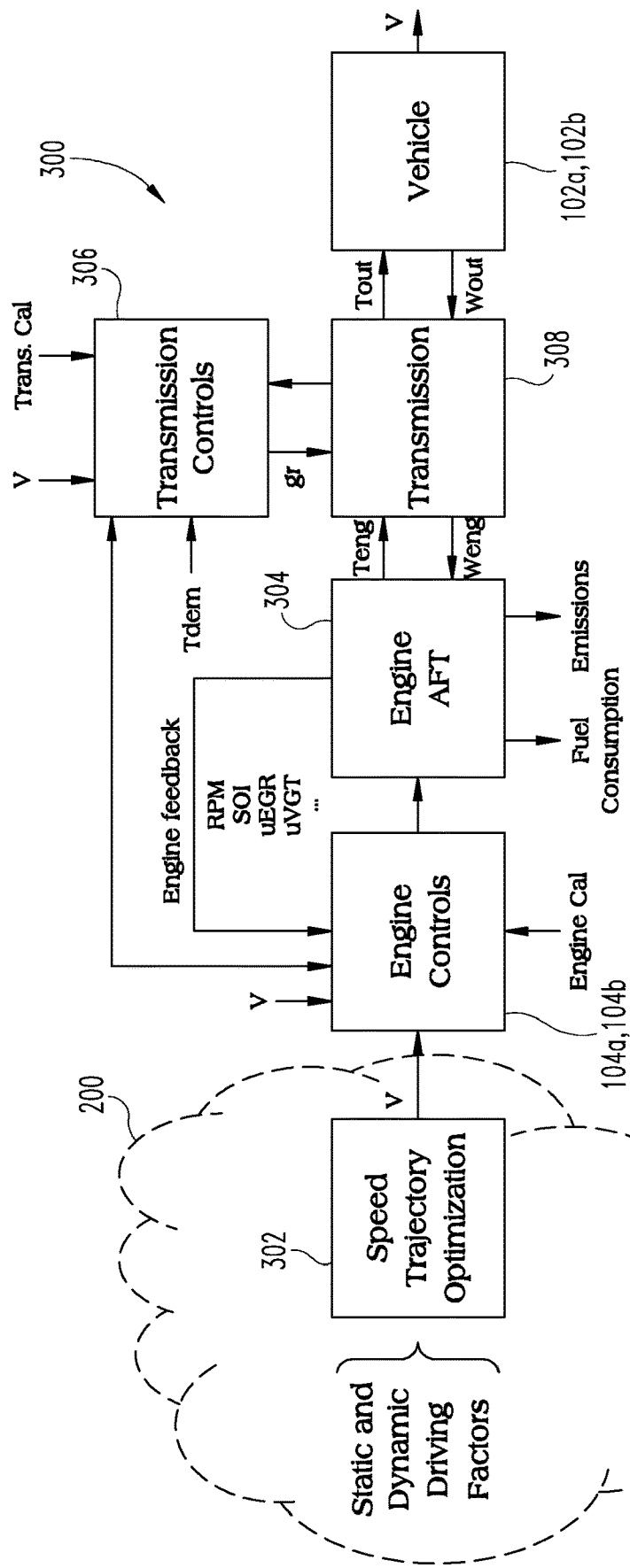
FIG. 3 depicts an embodiment of a control system useful to operate autonomous vehicle(s).

Referring to FIG. 3, there is shown a control system 300 for an autonomous vehicle such as vehicle 102a or 102b in operation within a platoon configuration or outside of a platoon configuration. Control system 300 includes a speed trajectory optimization block 302 within a cloud computing control system 200 that receives the static and dynamic driving factors and vehicle specific factors such as discussed above with respect to FIG. 2. The speed trajectory optimization block 302 outputs a speed trajectory reference $V_r$ along with a neutral coasting command to a vehicle controller, such as vehicle controller 104a discussed above.

The vehicle controller 104a, 104b is in communication with the powertrain such as an engine 304 and a transmission control block 306. Vehicle controller 104a and/or vehicle controller 104b controls engine 304 or other type of powertrain and an aftertreatment system (if provided) based on speed trajectory reference $V_r$ and neutral coasting command (if provided) and the engine or powertrain calibration parameters, vehicle speed V, transmission control feedback parameters, and engine (powertrain) feedback parameters. Vehicle controller 104a, 104b can provide outputs such as engine speed (RPM), engine start of ignition (SOI), exhaust gas recirculation flow (uEGR), variable geometry turbine (VGT) opening, etc. The engine torque is output to transmission 308 which controls powertrain output speed based on a gear selection from transmission control block 306. The torque output from transmission 308 drives the vehicle 102a, 102b at the desired vehicle speed V.

Various aspects of the present disclosure are contemplated. For example, in one aspect a method is provided that includes determining, with a cloud computing platform, a speed trajectory and a neutral coasting command for a first vehicle in response to one or more driving factors received by the cloud computing platform; receiving, with a vehicle controller of the first vehicle, the speed trajectory from the cloud computing platform; determining a reference speed for the first vehicle in response to the speed trajectory, the neutral coasting command and one or more vehicle specific factors associated with the first vehicle; and operating the first vehicle in response to the reference speed.

In one embodiment, the one or more driving factors include at least one static driving factor and at least one dynamic driving factor. In a refinement of this embodiment, the at least one static driving factor includes one or more of a road grade, a speed limit, and a stop location. In another refinement of this embodiment, the at least one dynamic driving factor includes one or more of a traffic condition, a stop signal condition, a wind condition, and an adjacent vehicle condition.

In another embodiment, the one or more vehicle specific factors include a speed of a preceding vehicle, a road surface condition, and a mass of the first vehicle.

In still another embodiment, the method includes determining, with a second cloud computing platform, a platooning formation control output for the first and second vehicles based on the one or more driving factors; and communicating the platooning formation control output to the first vehicle. In still a further refinement of the method, the first vehicle includes a first vehicle controller in communication with the cloud computing platform and the second vehicle includes a second vehicle controller in communication the second cloud computing platform. In a further refinement, the cloud computing platforms are in communication with one another in a cloud computing control system.

According to another aspect, a vehicle speed control system includes a cloud computing control system configured to receive one or more driving factors associated with a first vehicle. The cloud computing control system is further configured to determine a speed trajectory and a neutral coasting command for the first vehicle based on the one or more driving factors. The vehicle speed control system also includes a vehicle controller hosted in the first vehicle in operative communication with the cloud computing control system. The vehicle controller is configured to receive vehicle specific factors associated with the first vehicle and determine a reference speed for the first vehicle based on the vehicle specific factors, and based on the speed trajectory and neutral coasting command.

In one embodiment, the system includes a second vehicle controller hosted in a second vehicle. The second vehicle controller is in operative communication with the cloud computing control system. In a refinement of this embodiment, the cloud computing control system is further configured to provide an information signal for broadcast to each vehicle controller in a vehicle platoon that includes at least the first vehicle and other vehicles including at least the second vehicle. The first vehicle is a lead vehicle and each of the other vehicles trails the lead vehicle.

In a further refinement, the vehicle controllers of the first vehicle and of each of the other vehicles are configured to communicate with one another via a vehicle to vehicle communication system.

In another embodiment, the cloud computing control system includes a first cloud computing platform in communication with the vehicle controller in the first vehicle and a second cloud computing platform in communication with a second vehicle controller in a second vehicle. The first cloud computing platform and the second cloud computing platform are also in communication with one another.

In a further refinement, the vehicle controllers of the first and second vehicles are configured to communicate with one another via a vehicle to vehicle communication system. In another refinement, one of the first and second cloud computing platforms is configured to determine a platooning formation control output for the first vehicle based on the one or more driving factors and communicate the platooning formation control output to the first vehicle and to the other of the first and second cloud computing platforms.

In another aspect of the present disclosure, a vehicle control apparatus includes a cloud computing control system that determines a speed trajectory and a neutral coasting command for a first vehicle based on one or more driving factors associated with the first vehicle received by the cloud computing control system. The vehicle control apparatus includes a vehicle controller hosted in the first vehicle in operative communication with the cloud computing control system. The vehicle controller is configured to receive vehicle specific factors associated with the first vehicle and determine a reference speed for the first vehicle based on the vehicle specific factors, and based on the speed trajectory and the neutral coasting command determined by the cloud computing control system.

In one embodiment, the apparatus includes a second vehicle controller hosted in a second vehicle. The second vehicle controller is in operative communication with the cloud computing control system. Each vehicle controller receives an information signal broadcast by the cloud computing control system and the first and second vehicles operate in a vehicle platoon that includes at least the first vehicle and other vehicles including at least the second vehicle, and the first vehicle is a lead vehicle and each of the other vehicles trails the lead vehicle.

In one refinement of this embodiment, the vehicle controllers of the first vehicle and of each of the other vehicles are configured to communicate with one another via a vehicle to vehicle communication system.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A method, comprising:
    determining, with a cloud computing platform, a speed trajectory and a neutral coasting command for a first vehicle independently of any platoon formation in response to one or more driving factors input into the cloud computing platform remotely from the first vehicle;
    receiving, with a vehicle controller of the first vehicle, the speed trajectory and the neutral coasting command from the cloud computing platform;
    determining a reference speed for the first vehicle in response to the speed trajectory and the neutral coasting command, and one or more vehicle specific factors associated with the first vehicle; and
    operating the first vehicle in response to the reference speed, wherein operating the first vehicle includes coasting the first vehicle by disengaging a prime mover of the first vehicle from a transmission of the first vehicle.

2. The method of claim 1, wherein the one or more driving factors include at least one static driving factor and at least one dynamic driving factor.

3. The method of claim 2, wherein the at least one static driving factor includes one or more of a road grade, a speed limit, and a stop location.

4. The method of claim 2, wherein the at least one dynamic driving factor includes one or more of a traffic condition, a stop signal condition, a wind condition, and an adjacent vehicle condition.

5. The method of claim 1, wherein the one or more vehicle specific factors include a speed of a preceding vehicle, a road surface condition, and a mass of the first vehicle.

6. A vehicle speed control system, comprising:
    a cloud computing control system configured to receive one or more driving factors associated with a first vehicle that are input into the cloud computing control system remotely from the first vehicle, wherein the cloud computing control system is further configured to determine a speed trajectory and a neutral coasting command for the first vehicle independently of any platoon formation based on the one or more driving factors; and
    a vehicle controller hosted in the first vehicle in operative communication with the cloud computing control system to receive the speed trajectory and the neutral coasting command from the cloud computing control system, the vehicle controller configured to receive vehicle specific factors associated with the first vehicle and determine a reference speed for the first vehicle based on the vehicle specific factors, and based on the speed trajectory and the neutral coasting command operate the first vehicle to coast by disengaging a prime mover of the first vehicle from a transmission of the first vehicle.

7. The system of claim 6, further comprising:
    a second vehicle controller hosted in a second vehicle, wherein the second vehicle controller is in operative communication with the cloud computing control system.

8. The system of claim 6, wherein the cloud computing control system includes a first cloud computing platform in communication with the vehicle controller in the first vehicle and a second cloud computing platform in communication with a second vehicle controller in a second vehicle, and wherein the first cloud computing platform and the second cloud computing platform are also in communication with one another.

9. The system of claim 8, wherein the vehicle controllers of the first and second vehicles are configured to communicate with one another via a vehicle to vehicle communication system.

10. A vehicle control apparatus including a cloud computing control system that determines a speed trajectory and a neutral coasting command for a first vehicle independently of any platoon formation based on one or more driving factors associated with the first vehicle input to the cloud computing control system remotely from the first vehicle, wherein the vehicle control apparatus comprises:
    a vehicle controller hosted in the first vehicle in operative communication with the cloud computing control system to receive the speed trajectory and the neutral coasting command from the cloud computing control system, the vehicle controller configured to receive vehicle specific factors associated with the first vehicle and determine a reference speed for the first vehicle based on the vehicle specific factors, and based on the speed trajectory and the neutral coasting command determined by the cloud computing control system operate the first vehicle to coast by disengaging a prime mover of the first vehicle from a transmission of the first vehicle.

* * * * *